United States Patent
McArdle et al.

(10) Patent No.: US 6,622,126 B1
(45) Date of Patent: Sep. 16, 2003

(54) SEGMENT MIGRATION

(75) Inventors: James Michael McArdle, Austin, TX (US); Matthew Schall, Irving, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/373,649

(22) Filed: Aug. 13, 1999

(51) Int. Cl.[7] ............................................. G06F 17/60
(52) U.S. Cl. ...................... 705/26; 705/10; 345/745; 345/766; 345/962
(58) Field of Search ...................... 705/26, 10, 14; 706/45; 345/766, 962, 745

(56) References Cited

U.S. PATENT DOCUMENTS

| | | | |
|---|---|---|---|
| 5,179,643 A | | 1/1993 | Homma et al. ............. 395/140 |
| 5,659,724 A | * | 8/1997 | Borgida et al. ................ 707/3 |
| 5,806,060 A | * | 9/1998 | Borgida et al. ................ 707/3 |
| 6,073,112 A | * | 6/2000 | Geerlings ..................... 705/26 |
| 6,330,008 B1 | * | 12/2001 | Razdow et al. ............. 345/766 |
| 6,334,110 B1 | * | 12/2001 | Walter et al. ................ 705/14 |
| 6,480,194 B1 | * | 11/2002 | Sang'udi et al. ............ 345/440 |

FOREIGN PATENT DOCUMENTS

WO    WO 99/39281    *   8/1999    ............ G06F/17/30

OTHER PUBLICATIONS

Addolorato and Pacei, "Behind marketing Data", http://europa.eu.int/en/comm/eurostat/research/conference /ntts–98/papers/cp/001c.pdf, last modified Feb. 12, 1998 submitted by the applicant in IDS paper 4 and received on Jun. 14, 2001 consisting of 6 pages.*

Arthur Hughes, "The Goal: Influencing behaviour", http://www.relationshipmktg.com/Free%20Articles/rmr029.pdf, last modified Nov. 18, 1998 submitted by the applicant in IDS paper 4 and received on Jun. 14, 2001 consisting of 4 pages.*

MarketData Solutions, "Our core services", http://www.md-scorp.com/services.htm, last modified Dec. 8, 1999 submitted by the applicant in IDS paper 4 and received on Jun. 14, 2001 consisting of 2 pages.*

Mark Venables and Ugur Bilge, ".. Complex adaptive modeling at J Sainsbury: The SimStore supermarket supply chain experimenr", http://www.Ise.ac.uk/LSE/Complex/reports/report98mar.htm, Mar. 20, 1998 submitted by the applicant in IDS paper 4 and received o.*

Addolorato and Pacei, "Behind marketing Data", http://europa.eu.int/en/comm/eurostat/research/conference/ntts–98/papers/cp/001c.pdf, last modified Feb. 12, 1998 submitted by the applicant in IDS paper 4 and received on Jun. 14, 2001.*

(List continued on next page.)

Primary Examiner—Wynn W. Coggins
Assistant Examiner—Yogesh C Garg
(74) Attorney, Agent, or Firm—Marilyn Smith Dawkins Bracewell & Patterson, L.L.P.

(57) ABSTRACT

A system, program, and method which makes segment migration, the movement of individuals between segments over time, easily trackable, and provides a visualization that makes the results of the analyses useful. The preferred embodiment tracks which people are in which segment at each time period, then builds a file that gives, by person, a description of which segment(s) each person belonged to during each time period. From this table, a display is drawn which indicates in an intuitive manner the migration of members of different segments over time. These enhanced segmentation analyses allow the user to easily study and predict customer behaviors.

28 Claims, 3 Drawing Sheets

OTHER PUBLICATIONS

Mark Venables and Ugur Bilge, ".. Complex adaptive modeling at J Sainsbury: The SimStore supermarket supply chain experimenr", http://www.Ise.ac.uk/LSE/Complex/reports/report98mar.htm, Mar. 20, 1998 submitted by the applicant in IDS paper 4 and received o.*

) Arthur Hughes, "The Goal: Influencing behaviour", http://www.relationshipmktg.com/Free%20Articles/rmr029.pdf, last modified Nov. 18, 1998 submitted by the applicant in IDS pape 4 and received on Jun. 14, 2001 consisting of 4 pages.*

MarketData Solutions, "Our core services", http://www.mdscrop.com/services.htm, last modified Dec. 8, 1999, submitted by the applicant in IDS paper 4 and received on Jun. 14, 2001 consisting of 2 pages.*

TCRP Report 36, "A Handbook: Using Market Segmentation to Increase Transit Ridership", National Academy Press, Washington, D.C. 1998.*

Tony Brabazon, "Value migration", Accountancy Ireland; Dublin; Jun. 1999 vol. 31, Issue 3 extracted from proquest database: http://proquest.umi.com on Internet on Feb. 6, 2002.*

Gerola, Humberto C., Data Visualization analyses business information, Computer Dealer News; Willowdale; Mar. 12, 1999, vol. 15, Issue 10, p 2, extracted on Internet from http://proquest.umi.com on Sep. 11, 2002.*

Mattison, Rob, "Data Warehousing and Data Mining for Telecommunications", Artech House ,1997, Appendix D–The Decision WORKS suite from Advanced Software Applications, extracted on Internet from Books24X7.com, Inc. on Sep. 11, 2002.*

Buja et al., "Interactive High–Dimensional Data Visulaization", Journal of Computaional and Graphical Statistics, vol. 5, No. 1, pp. 78–99, 1996, American Statistical Association, extracted on Internet from http://proquest.umi.com on Sep. 11, 2002.*

Press release, "Retooling: Data collection and analysis", Marketing Tools, Apr. 97, Vol 4 Issue 3, p. 35 extracted from Internet from http:// web13.epnet.com on Sep. 10, 2002.*

Mirel, Barbara, .. Visualization for Data Exploration and Analysis: A critical Review of usability research, Fourth Quarter 1998, Technical Communication, manuscript received Apr. 15, 1998, extracted from Internet from http://proquest.umi.com on Sep. 10, 2002.*

Arthur Hughes, "The Goal: Influencing Behavior", http://www.relationshipmktg.com/Free%20Articles/rmr029.pdf, last modified Nov. 18, 1998.

Addolorato and Pacei, "Behind Marketing Data," http://europa.eu.int/en/comm/eurostat/research/conference/ntts–98/papers/cp/001c.pdf, last modified Feb. 12, 1998.

MarketData Solutions, "Our Core Services," http://www.mdscorp.com/services.htm, last modified Nov. 8, 1999.

Mark Venables and Ugur Bilge, "Complex Adaptive Modelling at J Sainsbury: The SimStore supermarket supply chain experiment," http://www.Ise.ac.uk/LSE/Complex/reports/reports98mar.htm, Mar. 30, 1998.

IBM Technical Bulletin, Improved Segmentation for Data Analysis, vol. 40, No. 8, Aug. 1997.

* cited by examiner

SEGMENT MIGRATION

BACKGROUND OF THE INVENTION

1. Technical Field

The present invention generally relates to behavior analysis and in particular to means for analyzing the behavior of members of a customer segment. Still more particularly, the present invention relates to an improved system, method, and program to track the migration of individuals from one customer segment to another.

2. Description of the Related Art

In many businesses, it is helpful to track the behavior, attitudes, or characteristics of individuals in order to better serve them or target them. To do so, a technique called customer segmentation or clustering is used, which classifies the customer into groups with common characteristics. For example, a retail business will often group customers by their buying habits, e.g., customers that purchase women's apparel as opposed to those that purchase consumer electronics. Many customer characteristics can be studied, including customer demographics, types of purchases, amount and frequency of purchases, etc. By grouping the entire class of customers into individual customer segments, it is easier evaluate and respond to many aspects of customer behavior, such as knowing where advertising dollars are and are not having an effect. Because of the widespread use of credit cards, personal checks, and "preferred shopper" cards, it is now relatively easy to track the buying habits of the great majority of customers.

Segmentation is well established, but provides only an instantaneous snapshot of the characteristics of each segment. A conventional segmentation analysis does not provide any insight into what the segment or its members will do next or have done in the past. That is, there is no view of the changes over time of a segment member.

Tracking how people change segments over their lives is an extremely difficult proposition, in part because there is no good visualization that make the results approachable or useful to an analyst. For example, while it is possible, using conventional means, to provide snapshots of customer segments at two different times, and to manually compare the member lists, this is so tedious as to be useless. It would be desirable to have a means for easily visualizing the migration of individuals between segments.

SUMMARY OF THE INVENTION

It is therefore one object of the present invention to provide an improved method for behavior analysis.

It is another object of the present invention to provide an improved means for analyzing the behavior of members of a customer segment.

It is yet another object of the present invention to provide an improved system, method, and program to track the migration of individuals from one customer segment to another.

The foregoing objects are achieved as is now described. The preferred embodiment provides a system, program, and method which makes segment migration, the movement of individuals between segments over time, easily trackable and provides a visualization that makes the results of the analyses useful. The preferred embodiment tracks which people are in which segment at each time period, then builds a file that gives, by person, a description of which segment (s) each person belonged to during each time period. From this table, a display is drawn which indicates in an intuitive manner the migration of members of different segments over time.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with, the accompanying drawings, wherein:

DETAILED DESCRIPTION OF THE PREFERRED EMBODIMENT

Figure 1:
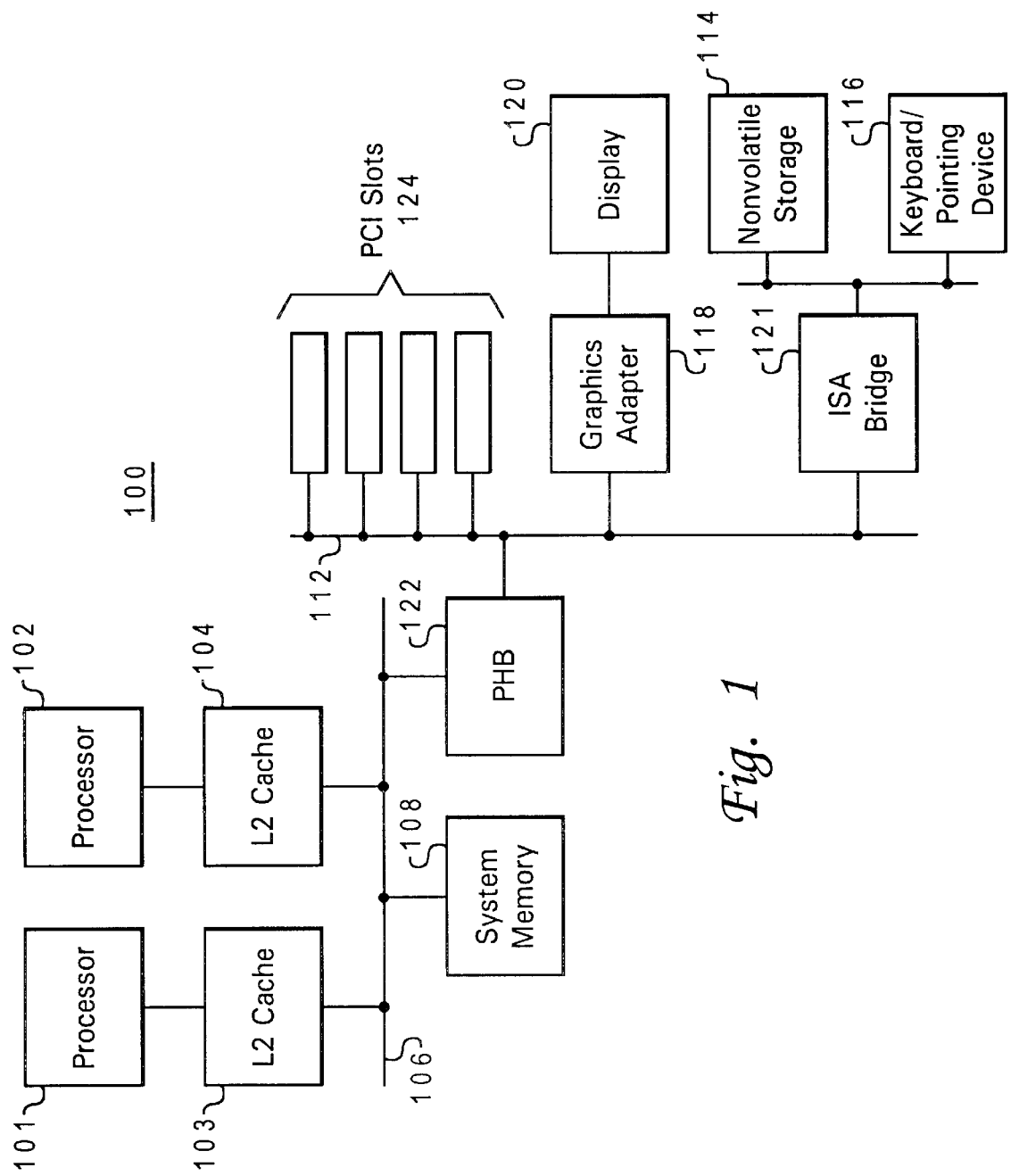
FIG. 1 depicts a computer system which performs a segment migration analysis in accordance with a preferred embodiment of the present invention.

With reference now to the figures, and in particular with reference to FIG. 1, a block diagram of a data processing system in which a preferred embodiment of the present invention may be implemented is depicted. Data processing system 100 may be, for example, one of the computers available from International Business Machines Corporation of Armonk, NEW YORK. Data processing system 100 includes processors 101 and 102, which in the exemplary embodiment are each connected to level two (L2) caches 103 and 104, respectively, which are connected in turn to a system bus 106.

Also connected to system bus 106 is system memory 108 and Primary Host Bridge (PHB) 122. PHB 122 couples I/O bus 112 to system bus 106, relaying and/or transforming data transactions from one bus to the other. In the exemplary embodiment, data processing system 100 includes graphics adapter 118 connected to I/O bus 112, receiving user interface information for display 120. Peripheral devices such as nonvolatile storage 114, which may be a hard disk drive, and keyboard/pointing device 116, which may include a conventional mouse, a trackball, or the like, are connected via an Industry Standard Architecture (ISA) bridge 121 to I/O bus 112. PHB 122 is also connected to PCI slots 124 via I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 and the exemplary figures below are provided solely as examples for the purposes of explanation and are not intended to imply architectural limitations. In fact, this method and system can be easily adapted for use on any programmable computer system, or network of systems, on which software applications can be executed.

Figure 2:
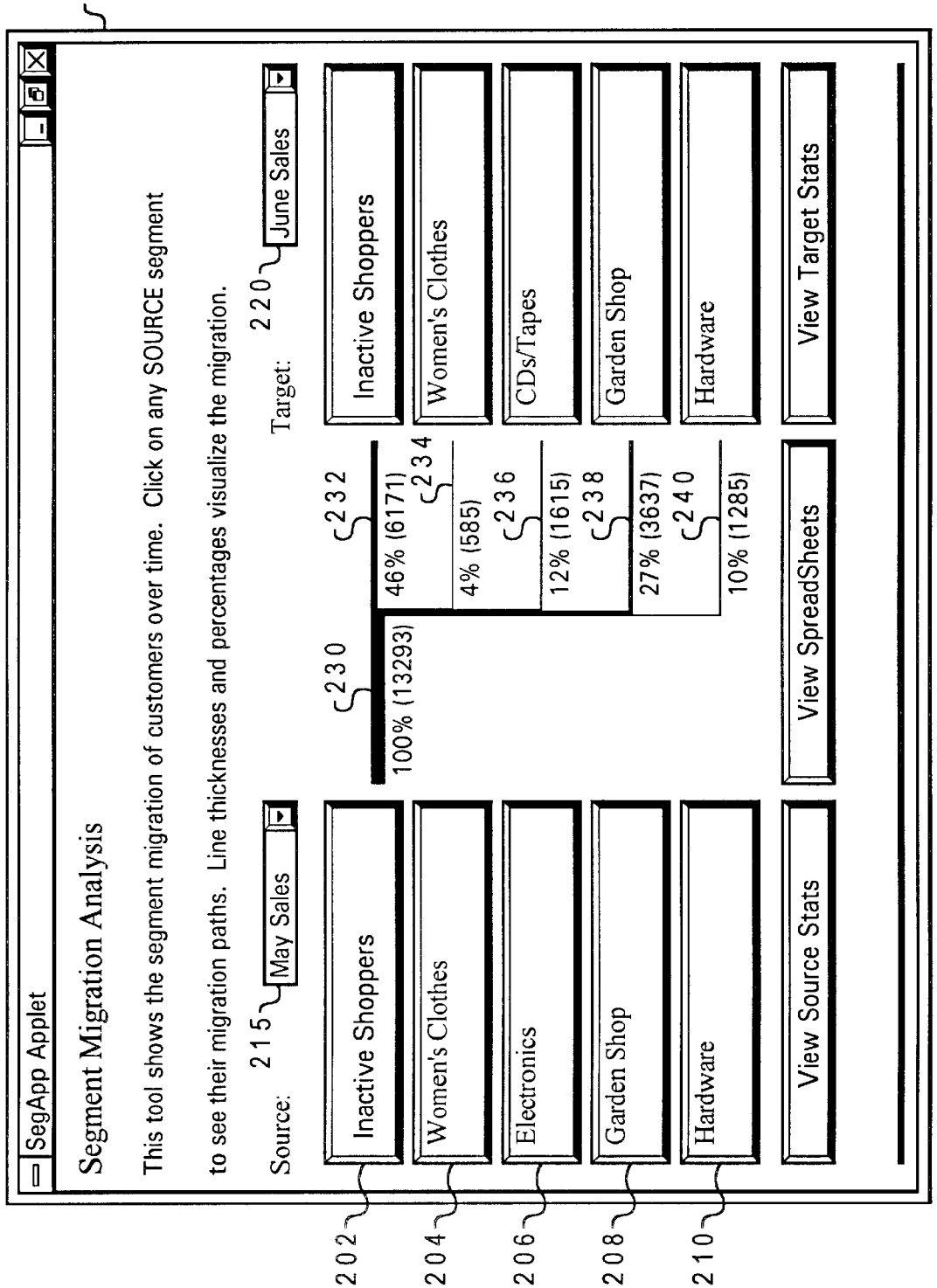
FIG. 2 is a sample display screen in accordance with a preferred embodiment of the present invention.

FIG. 2 shows an exemplary screen 200 of a computer program according to the preferred embodiment. Here, five sample customer segments, as might be found in a retail department store, are shown, including Inactive Shoppers 202, Women's Clothing 204, Electronics 206, Garden Shop 208, and Hardware 210. The user is given the option of selecting the source data 215 (here, the user has chosen "May Sales") and the target data 220 (the user has chosen "June Sales"). Note that because this innovative system tracks segment migration over time, the source data 215 should reflect an earlier period than the target data 220.

In this example, the user has selected the "Inactive Shoppers" 202. According to the preferred method, the system has therefore chosen the May inactive shoppers segment, which is comprised of 13,283 shoppers, in this example, and has created a clear visual representation of the behavior of these customers, as a group, in June. A set of lines is drawn connecting the source segment with each of the target segments, with a line thickness dependent on the percentage of segment members moving to each target segment.

For example, the initial line 230 coming from the source "Inactive Shoppers" segment is very thick, indicating that it represents 100% of the members of that segment. This line then splits into individual lines going to each target segment. The line 232 going to the June inactive shoppers, for example, is nearly half as thick as the original line, and indicates that 46% of those people who were inactive shoppers in May continued to be inactive in June. A much thinner line 234 indicates that only 4% of the May inactive shoppers purchased Women's Clothes in June. Similar lines 236/238/240, with appropriate respective thicknesses, run to each of the other target segments.

Figure 3:
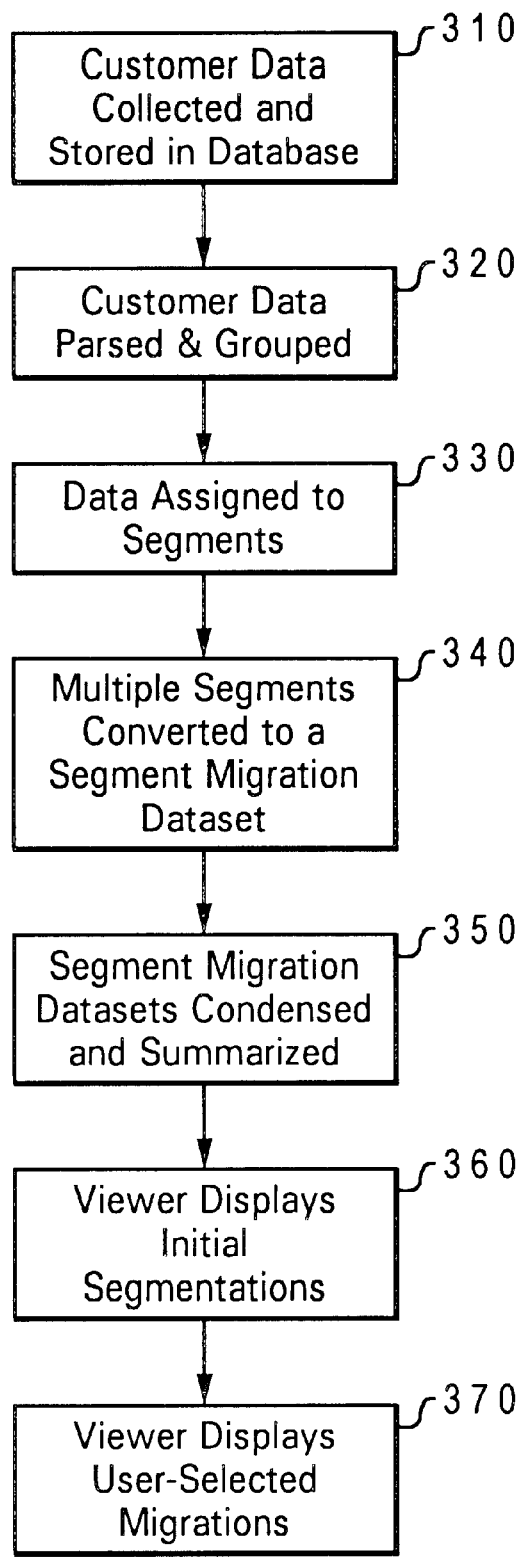
FIG. 3 is a flowchart of a process in a accordance with a preferred embodiment of the present invention.

With reference now to FIG. 3, and according to the preferred embodiment, a typical segment migration analysis process would occur as follows. First, information relating to customer transactions is collected and stored in a database (step 310). The information would include the customer ID, what items were bought. and when the items were bought. The customer ID might be loyalty card ID (e.g., Walmart's shoppers card or Tom Thumb's Reward card), a customer credit card number, or a customer driver's license number.

Next, the customer transaction data is separated into monthly (or other periodic) sales datasets (step 320), grouping items by product category (e.g. men's ties, socks, suits might be collectively grouped as men's clothing), retaining the Customer ID, money spent of each product category and month bought. The time period, of course, can be customized to the user's need, and could be monthly, quarterly, weekly, etc. Similarly, the product categories can be defined by the user according to the analysis needed.

Next, the customers are assigned into defined segments of people using a data mining algorithm or a user defined set of rules (step 330). For example, a person might be assigned to a segment, e.g., purchasers of men's clothing, according to where they spent the greatest number of dollars in a given month. The segmentation is stored according to monthly sales data by customer ID with an assigned segment number.

Next, two or more monthly segmentations are selected and these datasets are merged into a single Segment Migration dataset using the Customer ID as the common key (step 340). For example, for a given customer ID, the dataset would show what segment that customer was assigned to in May, June and July.

Next. The Segment Migration dataset is summarized into numbers of customers with the same segment migration signature (step 350), i.e., in May they were in segment 1, in June they migrated to segment 2 and in July they migrated to segment 3. In this example, the following results might appear:

There were 52 customers in May Seg #1, June Seg #1, and July Seg #1.

There were 75 customers in May Seg #1, June Seg #2, and July Seg #3.

There were 90 customers in May Seg #1, June Seg #2, and July Seg #4.

Next, the summarized segment migration dataset are loaded into the Segment Migration Viewer and the user-selected segmentations are displayed (step 360). For example, the user may choose to see just the May-to-June migration. Because the summarized segment migration dataset is compiled over three months, in this example, the migration counts shown on the screen are computed by summing over all non-displayed segmentations.

For example, the total group migrating from May Seg #1 to June Seg #2 would necessarily include all customers that meet that criteria, regardless of which segment they belonged to in July. If we display May vs. June segmentations, which is a two-dimensional (2D) count, then we must sum over July because the segment migration dataset was constructed with May, June and July counts, which is three-dimensional (3D). We must account for all customers according to their May and June segmentation, regardless of their July segmentation.

2D-COUNT=SUM over JULY of 3D-COUNT [may, june] [may, june, july]

where may, june and july represent a segment number, so that 2D-COUNT[1,2] would indicate those who were members of May Seg #1 and June Seg #2. Since the data is stored according to 3-month patterns, 3D-COUNT[1,2,3] would indicate those who were members of May Seg #1, June Seg #2, and July Seg #3. So to produce the 2D-COUNT figure from the 3-month segment migration dataset, the 3D-COUNTs are summed:

2D-COUNT[1,2]=3D-COUNT[1,2,1]+3D-COUNT[1,2,2]+ . . . +3D-COUNT [1,2,9]

Finally, as each segment is selected on the left, the migration paths are drawn and annotated with counts and percentages, as described above (step 370).

This system provides many advantages in customer segmentation analysis. In the process of creating the data to drive the visualizations, a table is built that captures who was in which segment at a given time, and, when complete, this table captures each person's migration history. This data can be re-integrated with the customer's data warehouse to support marketing actions. That is, once the customer segmentation migration history has been displayed, the user can target specific customers, with particular patterns of migration for targeted marketing or promotions.

Another advantage of this system lies in providing the user with an understanding of what individual customers are doing in terms of groups of behaviors, and what they have done in the past. This evaluation cannot be performed in any manageable fashion using current methods.

Using this system and method, the migration behavior of individual customers can be easily characterized, and future segment membership can be predicted, which is a tremendous advantage in many contexts. For example, by studying customer migration patterns using this tool, it may be possible to target family-oriented promotions at customers several months before those customers even have kids.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention. For example, the segment migration tool described above is particularly advantageous when used to study data gathered from on-line transactions. Using credit card numbers, customer IDs, "cookies", or other means of tracking individual purchases or other transactions over the internet or other networks, the innovative system disclosed here can be used to analyze and predict the behaviors of a great many on-line customers.

What is claimed is:

1. A method for analyzing segment migration utilizing collected transaction data, wherein the collected transaction data is assigned to multiple data segments and each of the data segments is associated with a respective time period, comprising:
   building a segment migration dataset from the multiple data segments;
   selecting first and second time periods; and
   displaying at the same time, on a computer display, members of a first plurality of data segments corresponding to the selected first time period and members of a second plurality of data segments corresponding to the selected second time period, including:
      selecting a data segment from the first plurality of data segments; and
      displaying a migration of members from the selected data segment to each data segment in the second plurality of data segments.

2. The method of claim 1, wherein the first time period is an earlier period of time than the second time period.

3. The method of claim 1, wherein the transaction data is collected from customer purchases.

4. The method of claim 1, wherein the transaction data is recorded according to customer identifications.

5. The method of claim 1, wherein the segment data includes transactions made in each of a plurality of months.

6. The method of claim 1, wherein the migration of segment members is displayed using a series of connecting lines, each line having a respective thickness according to the number of segment members represented by that migration.

7. The method of claim 1, wherein the segment migration dataset is comprised of multiple entries each representing the segment membership of an individual over time.

8. The method of claim 1, wherein each segment also corresponds with a respective type of consumer purchase.

9. A computer system having at least a processor, accessible memory, and an accessible display, the computer system comprising:
   means for collecting transaction data;
   means for assigning the transaction data to multiple data segments, each segment corresponding to a respective period of time;
   means for building a segment migration dataset from the multiple data segments;
   means for selecting first and second time periods; and
   means for displaying at the same time, on a computer display, members of a first plurality of data segments corresponding to the selected first time period and members of a second plurality of data segments corresponding to the selected second time period, including:
      means for selecting a data segment from the first plurality of data segments; and
      means for displaying a migration of members from the selected data segment to each data segment in the second plurality of data segments.

10. The system of claim 9, wherein the first time period is an earlier period of time than the second time period.

11. The system of claim 9, wherein the transaction data is collected from customer purchases.

12. The system of claim 9, wherein the transaction data is recorded according to customer identifications.

13. The system of claim 9, wherein the segment data includes transactions made in each of a plurality of months.

14. The system of claim 9, wherein the migration of segment members is displayed using a series of connecting lines, each line having a respective thickness according to the number of segment members represented by that migration.

15. The system of claim 9, wherein the segment migration dataset is comprised of multiple entries each representing the segment membership of an individual over lime.

16. The system of claim 9, wherein each segment also corresponds with a respective type of consumer purchase.

17. A computer program product having computer readable program code on a computer usable medium, comprising:
   instructions for collecting transaction data;
   instructions for assigning the transaction data to multiple data segments, each segment corresponding to a respective period of time;
   instructions for building a segment migration dataset from the multiple data segments;
   instructions for selecting first and second time periods; and
   instructions for displaying at the same time, on a computer display, members of a first plurality of data segments corresponding to the selected first time period and members of a second plurality of data segments corresponding to the selected second time period, including:
      instructions for selecting a data segment from the first plurality of data segments; and
      instructions for displaying a migration of members from the selected data segment to each data segment in the second plurality of data segments.

18. The computer program product of claim 17, wherein the first time period is an earlier period of time than the second time period.

19. The computer program product of claim 17, wherein the transaction data is collected from customer purchases.

20. The computer program product of claim 17, wherein the transaction data is recorded according to customer identifications.

21. The computer program product of claim 17, wherein the segment data includes transactions made in each of a plurality of months.

22. The computer program product of claim 17, wherein the migration of segment members is displayed using a series of connecting lines, each line having a respective thickness according to the number of segment members represented by that migration.

23. The computer program product of claim 17, wherein the segment migration dataset is comprised of multiple entries each representing the segment membership of an individual over time.

24. The computer program product of claim 17, wherein each segment also corresponds with a respective type of consumer purchase.

25. A method for presenting segment migration data on a computer display, comprising:

displaying at least one source object representing a source data segment;

displaying at least two target objects representing target data segments, the target data segments having at least some common segment members with the source data segment; and representing segment membership at a later time than the source data segment; and displaying a graphic association object between the source object and at least one target object, the graphic association representing the percentage of members of the source data segment that are also members of the target data segment.

26. The method of claim 25, wherein the graphic association object is a line connecting the source object to the target object, and the thickness of the line indicates the percentage of members of the source data segment that are also members of the target data segment.

27. The method of claim 25, further comprising
displaying, with each graphic association object, the percentage of members of the source data segment that are also members of the target data segment.

28. The method of claim 25, further comprising
displaying, with each graphic association object, the number of members of the source data segment that are also members of the target data segment.

* * * * *